United States Patent [19]
Weidenmiller

[11] 3,764,113
[45] Oct. 9, 1973

[54] DOUGH FORMING AND EXTRUDING MACHINE

[75] Inventor: Edward A. Weidenmiller, Morton Grove, Ill.

[73] Assignee: Weidenmiller Co., Morton Grove, Ill.

[22] Filed: Dec. 13, 1971

[21] Appl. No.: 207,319

[52] U.S. Cl.................. 259/185, 259/104, 425/204
[51] Int. Cl............................................... A21c 1/08
[58] Field of Search..................... 259/185, 186, 187, 259/188, 190, 194, 195, 104, 6, 21, 41; 425/201, 204, 202, 207

[56] References Cited
UNITED STATES PATENTS

| | | | |
|---|---|---|---|
| 2,092,720 | 9/1937 | Urquhart | 425/201 |
| 2,868,517 | 1/1959 | Lasch | 259/6 |
| 2,947,524 | 8/1960 | Bridges | 259/104 |

Primary Examiner—Robert W. Jenkins
Attorney—Robert C. Brown, Jr. et al.

[57] ABSTRACT

A dough forming and extruding machine having upper and lower pairs of staging and feeding rolls coordinated by driving mechanisms operating the rolls at similar speed wherein the staging rolls, being of smaller diameter, result in higher surface speed of the feed rolls whereby linear travel of the feed rolls is greater, thus increasing pressure of the dough against the extrusion openings.

3 Claims, 6 Drawing Figures

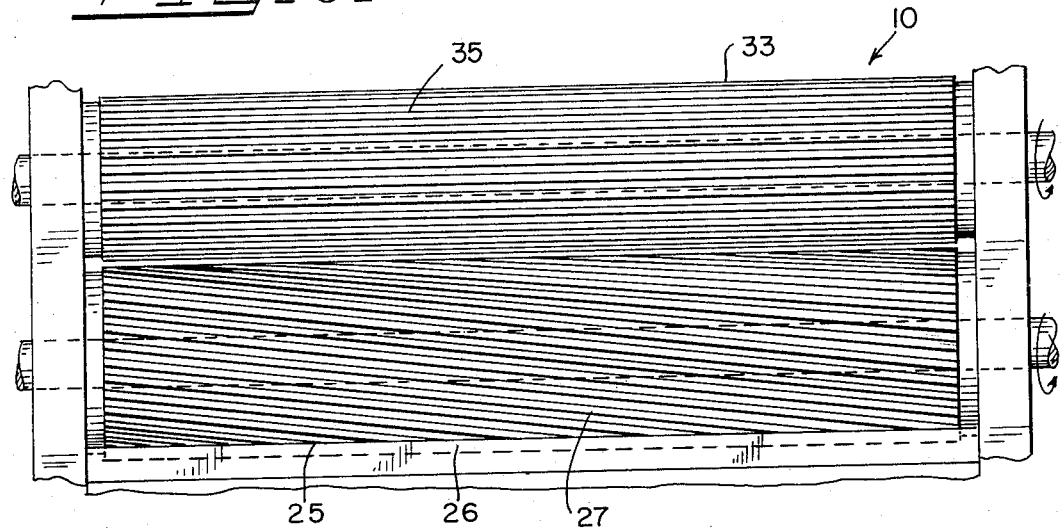
FIG-5-
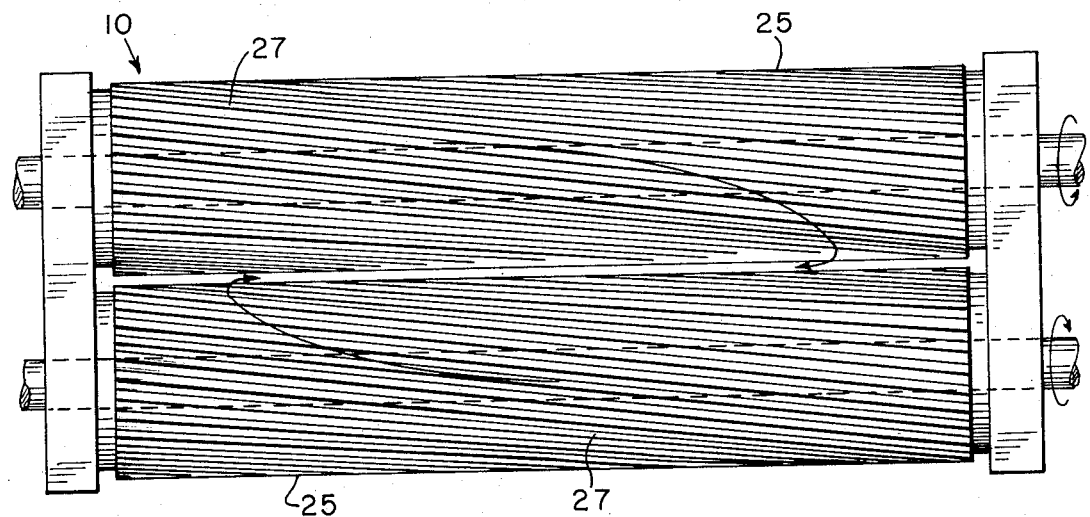
FIG-6-

DOUGH FORMING AND EXTRUDING MACHINE

BACKGROUND OF THE INVENTION

Machines in this art heretofore have utilized top rolls to feed dough to feed rolls which relatively were of insufficient size and inadequate to develop or maintain the pressure on the dough necessary to feed the dough uniformly to die plate openings and obtain consistent weight of every dough blank. Lack of uniformity in dough masses fed directly to such feed rolls without benefit of preforming the mass by means of proper staging rolls resulted in trapping air in the dough which became trapped in the area between the bottom of the feed rolls and the top surface of the usual die plate. The trapped air, in the form of air pockets, then shifted intermittently across this area and resulted in starving die plate openings and affected the weight of dough blanks deposited from the openings. Variations in the size and thickness of such blanks resulted in overbaking of some of the finished pieces deposited at one cutting from the several openings across the extent of the die plate. This lack of uniformity in the dough deposits from the die plate openings also caused weight and count differentials. These differentials resulted in disadvantages involving:

1. Package underweight, which is a City, State and Federal violation.
2. Package overweight, which represents a profit loss to the manufacturer.
3. Wrapping machine inefficiency.

When periodic oversize or undersize products enter a wrapping machine they cause improper closure of the package, poor sealing and possible damage to the product. Additional damage may occur in mass packaging of predetermined carton quantities and in the stacking of the packaged goods on shelves in sales areas.

OBJECTS OF THE INVENTION

The principal object of the invention is the provision of a dough forming and extruding machine wherein the dough mass is processed and prepared for even distribution prior to being received by compression feed rolls.

An important object of the invention is to provide a dough forming and extruding machine having a pair of upper staging rolls and a pair of lower feeding rolls operating in unison to first prepare the dough for even distribution before receipt by the feed rolls and then provide pressure on the dough against openings in a bottom die plate.

Another object of the invention is the provision of a dough forming and extruding machine having pairs of upper and lower staging and feeding rolls wherein the feeding rolls have a higher surface speed than the surface speed of the staging rolls.

A further object of the invention is to provide a dough forming and extruding machine having pairs of upper and lower staging and feeding rolls wherein the staging rolls evenly distribute the dough and the feeding rolls increase the pressure on the dough against extrusion openings in a bottomdie plate.

A still further object of the invention is the provision of a dough forming and extruding machine having a pair of upper staging rolls and a pair of lower feeding rolls wherein the feeding rolls have spiral surface means which in face-to-face relation operate in a right hand and left hand movement respectively to effect a movement of the dough away from the ends of the doughhopper and direct the dough over bottom die plate openings.

Another object of the invention is to provide a dough forming and extruding machine having a pair of upper staging rolls and a pair of lower feeding rolls wherein the feeding rolls are of larger diameter than that of the staging rolls.

A further object of the invention is the prevision of a dough forming and extruding machine having a pair of staging rolls and a pair of feeding rolls wherein the staging rolls have longitudinal straight surface means to grip and move the dough transversely of the rolls and said feeder rolls have spirally disposed surface means to engage and move the dough longitudinally of the rolls.

DESCRIPTION OF THE DRAWINGS

The foregoing and other objects of the invention are attained by the structure and arrangement illustrated in the accompanying drawings wherein:

FIG. 5 is a transverse sectional view through the dough hopper between the rolls showing the straight and spiraled grooves on the upper staging rolls and lower feeding rolls respectively taken on the line 5—5 of FIG. 3; and FIG. 6 is a horizontal sectional view taken on the line 6—6 of FIG. 3 showing the right hand and left hand disposition of the surface grooves on the feed rolls.

SUMMARY OF THE INVENTION

Figure 1:
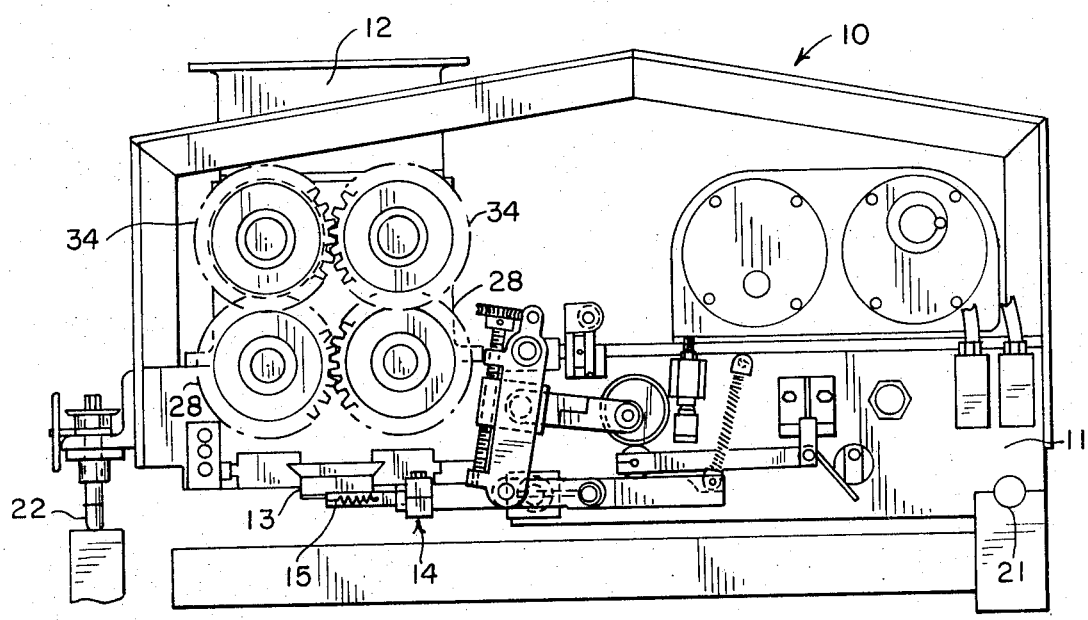
FIG. 1 is a side elevational view of a dough forming and extruding machine constructed in accordance with this invention.

The present invention provides a dough forming and extruding machine which as disclosed, has been designed primarily for use in the production of cookies and provides means in the machine for evening out the dough mass fed to the machine from a dough trough or conveyor system so that the dough before being fed to feed rolls is evened out to a uniformly distributed amount to provide smoothly textured dough of uniform volume as delivered by the feed rolls to the cavity between th bottom surface of the feed rolls and an underlying die plate having openings through which the thus uniformly textured dough is extruded under pressure of the feed rolls to obtain consistently uniform dough blanks from the several openings.

The machine includes four dough handling rolls including a pair of feed rolls and a pair of auxiliary or staging rolls all driven in unison. The staging rolls are disposed above the feed rolls to distribute the incoming dough evenly prior to its being received by the feed rolls which are of larger diameter than the staging rolls and increase the pressure on the dough to obtain extruded dough blanks of equal weight, size and thickness. The four rolls include surface means for manipulating the dough as it is processed through the machine. On the staging rolls this means is straight and extends longitudinally of the respective rolls. On the feed rolls the surface means is disposed spirally of the rolls and such that when face-to-face on the opposing rolls operate in right hand and left hand movements respectively to move the dough mass away from the ends of the hopper and over the extrusion openings in the bottom die plate. The straight longitudinal surface means on the staging rolls serve to grip the dough and distribute it into the maw defined by the feed rolls.

The four rolls are driven at substantially the same speed. However, the feed rolls being of larger diameter than the staging rolls consequently have a higher surface speed so that pressure on the dough mass therefore is increased inasmuch as the linear distance traveled by the feed rolls is greater than the linear distance traveled by the staging rolls. The spirally disposed surface means on the feed rolls contributes to the ability of the rolls to increase the pressure on the dough. The spiral arrangement of this surface means also serves to avoid parallel contact with the usual scraper blade forming an integral part of the cavity above the bottom die plate.

The upper and lower pairs of rolls are spaced apart laterally with the spacing of the staging rolls being such as to provide free access of the dough supplied thereto and to provide for uniform spreading of the dough mass before it is received by the feed rolls which are spaced apart less than the staging rolls thereby to initiate the application of pressure on the dough. The diameter of the staging rolls and the spacing thereof also are such as to provide support for a dough mass in a quantity related to the displacement of the hopper forming an integral part of the machine.

The staging rolls also function as wipers for the compression or feed rolls to maintain a uniform layer or coating of dough on the feed rolls and avoid any build-up of excess dough and thereby prevent such excess from falling into the area of the product zone. The staging rolls act to retard the dough to measure the precise degree of dough pressure against the die plate openings to obtain uniform weight of each dough blank extruded therethrough. As disclosed herein all four staging and feed rolls are coordinated by means of sprockets and chains which tie the rolls together for operation in unison.

The upper staging rolls, of smaller diameter, are located on the same vertical centerlines with the respectively associated lower feed rolls, of relatively larger diameter, but irrespective of the different diameters of the respective pairs of rolls the inside radii of the dough mass is substantially similar on the staging rolls and on the feed rolls.

It will be noted that the machine is pivotally mounted at one end and adjustably mounted at the other end. This is for the purpose of meeting specifications relating to various oven framework and enabling mounting of the machine in association with such framework and to enable the baker to position the machine as required to provide for delivery of the dough blanks oriented in relation to the travel of the ovenband.

DESCRIPTION OF PREFERRED EMBODIMENT

The present invention represents an improvement in the Cookie Forming Machine of prior U.S. Pat. 2,838,013 of June 10, 1958 to Robert M. Weidenmiller and Jack E. Weidenmiller, the disclosure whereof is incorporated herein by this reference.

In the attached drawings 10 generally designates a dough forming and extruding machine having a framework 11 supporting a dough hopper 12. A plurality of extrusion openings provided by nozzles 13 are mounted adjacent to the bottom of the hopper 12. Cutting mechanism 14 including the cutting wire 15 is suitably mounted for association and operation in relation to the dough discharge nozzles 13 to slice the dough extruding from the openings into a plurality of blanks which drop onto a conveyor for transport into an oven for baking. This mechanism is generally similar to that disclosed in the prior patent above referred to and a more complete discription of the operation thereof may be had by reference to the description of similar parts in that disclosure. Driving mechanism provided in the present machine also is generally similar to like parts provided in the prior patent including driving motor 16 and speed control mechanism 17. A chain 18 driven by sprocket 19 on the speed control shaft drives a sprocket 20 which drives the dough handling rolls hereinafter to be described. The entire dough handling and extruding machine is pivotally mounted at 21 and adjustably supported adjacent its opposite end by means of screw actuated feet 22. This enables the machine to be adjusted the the sprocket mounted at relative to particular conveyor and oven conditions. Except for this last named feature all the machine elements to the extent thus far described may be found in the prior disclosure of the above-named patent.

Figure 3:
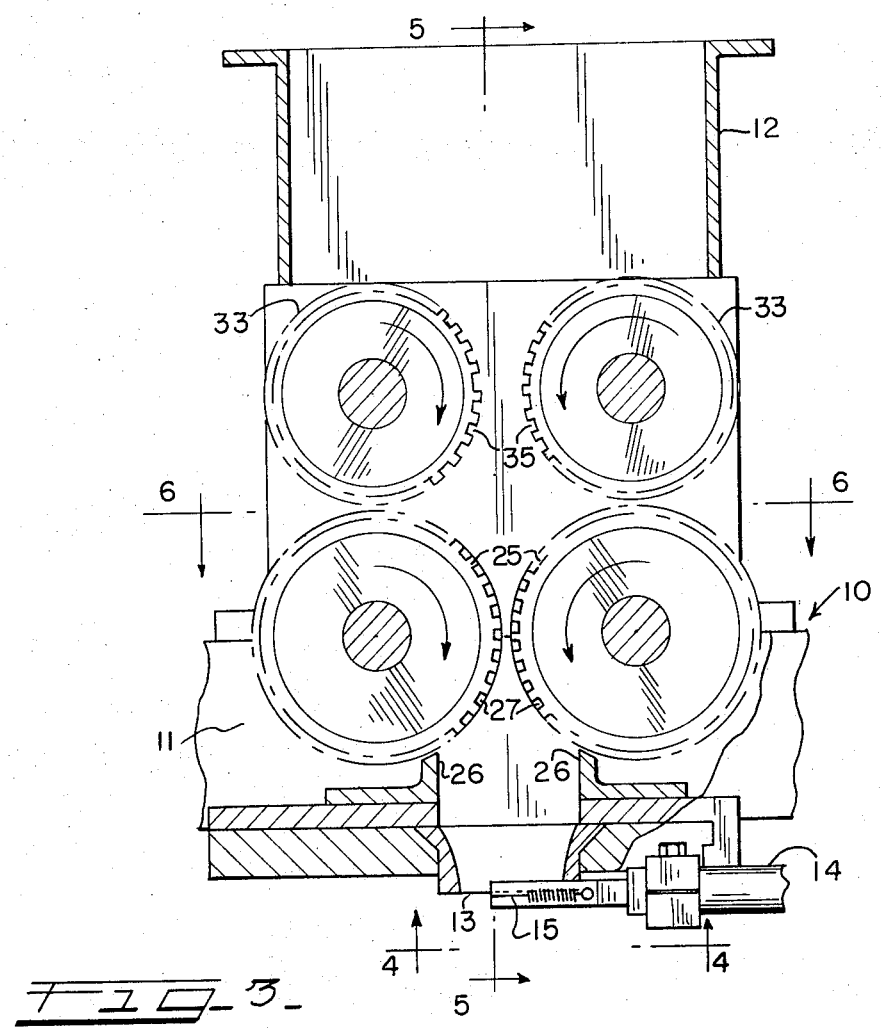
FIG. 3 is a longitudinal sectional view through the dough forming and extruding machine showing the arrangement and relationship of the pairs of staging and feeding rolls.
Figure 4:
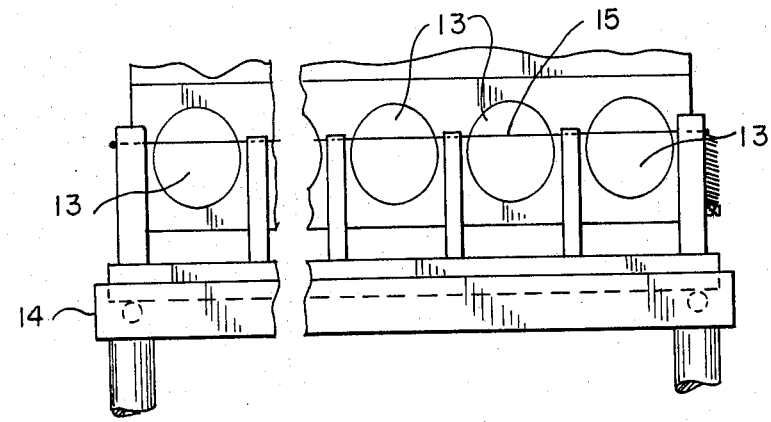
FIG. 4 is a detail view from the line 4—4 in FIG. 3 illustrating the bottom extrusion openings and showing the mounting of the cutting wire and the relation thereof to the openings.

The prime improvement in the present dough forming and extruding machine over that prior machine relates to the pairs of staging and feeding rolls provided in the dough hopper 12 and the arrangement and operation thereof together with improved features of the rolls and their relationship. The pair of feed rolls 25 is mounted in the hopper 12 adjacent to the bottom area thereof and a pair of scraper blades 26 for the respective rolls is mounted in the bottom of the hopper to remove dough from the surface of the rolls as they are rotating and direct the dough through the bottom extrusion openings 13. As shown in FIG. 3, the rolls 25 are spaced apart for the working or kneading of the dough which passes therebetween into the bottom discharge area. The rolls 25 are provided with surface grooves 27 which are spirally disposed and in the face to face relationship of the opposing rolls as best shown in FIG. 6, the spiral grooves on the respective rolls are disposed right and left so that during rotation the spiral grooves have the effect of working the dough longitudinally of the rolls away from the opposite end walls of the hopper 12 as indicated by the arrows in FIG. 6. The spiralled grooves 27 also avoid a direct abutting relationship with the scrapers 26 and instead afford a sliding relationship therewith which cleans the surfaces of the rolls during operation.

Figure 2:
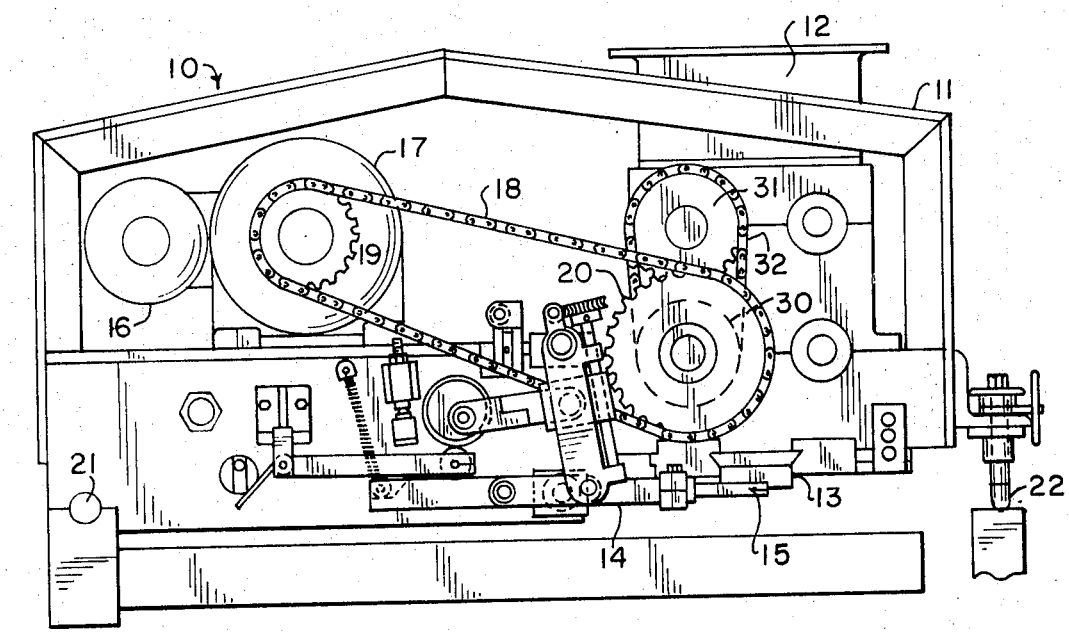
FIG. 2 also is a side elevational view but showing the opposite side of the machine from that illustrated in FIG. 1.

As shown in FIG. 1 the rolls 25 are drivingly connected together for simultaneous operation by means of intermeshing gears 28. These gears are disposed at the opposite ends of the rolls from the driving sprocket 20 so that the chain and sprocket driving mechanism is disposed at one side of the machine 10 and the intermeshing gears 28 are disposed at the opposite side of the machine. At the inner side of the sprocket 20 a sprocket 30 is also mounted on the same shaft for rotation therewith. This latter sprocket is drivingly connected with a sprocket 31 by means of a chain 32. The sprocket 31 drives a pair of upper staging rolls 33 which are interconnected for simultaneous operation by means of intermeshing gears 34 and again these intermeshing gears are disposed on one side of the machine while the sprocket 31 and driving mechanism are disposed on the opposite side of the machine, as shown in FIGS. 1 and 2 respectively. The gears 34 intermesh with each other and the gears 28 intermesh with each other but the two sets of gears do not have any direct driving connection therebetween. The gears 34 and the gears 28 are located in different planes with the gears 28 disposed in a plane offset inwardly from the plane of the gears 34. The only driving connection between the lower feed rolls 25 and the upper staging rolls 33 comprises the chain 32 and associated sprockets 30 and 31.

The gearing and driving connections between the lower feed rolls 25 and upper staging rolls 33 is such that all of the rolls rotate at the same speed. However, it will be noted, as best shown in FIGS. 3 and 5, that the feed rolls 25, of identical size with respect to each other, are of relatively larger diameter than the staging rolls 33 which are of like size relative to each other. This has the effect of imparting relatively higher lineal surface speed to the feed rolls while all four rolls rotate simultaneously at the same r.p.m. The axes of the respective upper staging rolls are on the same vertical center lines with the respectively associated lower feed rolls so that with the upper rolls being of smaller diameter the staging rolls are spaced farther apart than the underlying lower feed rolls whereby to provide a wider maw into which the dough is fed from the trough 12. This relationship also affords a wiping action between the respectively associated over-and-under rolls 33 and 25 so that the dough is caused to feed down the center and prevented from escaping outwardly between the respectively associated upper and lower rolls. The staging rolls 33 also are provided with surface grooves 35 to grip the dough and aid in manipulating the mass of dough but in this case the grooves are straight and parallel running lengthwise of the rolls. These grooves have the effect of taking the dough from the hopper 12 and moving it in a direction transversely of the rolls to feed it downwardly directly into the mouth of the feed rolls 25.

The staging rolls 33 knead the incoming dough from the hopper 12 and feed it directly to the feed rolls 25 which work the dough back and forth longitudinaly of the rolls across the hopper between the end walls thereof by the right hand and left hand action of the spiraled grooves 27 thereby breaking up and eliminating any air pockets in the dough mass to provide an even flow of the dough to all of the extrusion openings 13. The staging rolls 33 during operation, build up pressure in the dough mass fed to the feed rolls 25 and the feed rolls because of their higher surface speed, which results in greater lineal travel of the roll surfaces, increase the pressure built up in the dough mass and thereby provide an even distribution of the dough through all of the bottom discharge outlets 13. This affords dough blanks from the several extrusion nozzles of uniformly consistent weight and avoids any possibility of starving any one or more of the outlets.

From the foregoing it will be seen that there has been provided a dough forming and extruding machine having two pairs of dough processing rollers comprised of upper staging rolls having a relatively wide entrance maw and lower feeding rolls with more closely spaced working surfaces wherein all of the rolls operate in unison and the feed rolls have relatively greater lineal surface travel than the staging rolls with surface means on the staging rolls to move dough into the feed rolls and surface means on the feed rolls to work the dough longitudinally of the rolls and wherein the rolls are disposed in vertically aligned pairs providing a wiping action between associated rolls.

What is claimed is:

1. A dough forming and extruding machine including a hopper and extrusion means, a pair of feed rolls mounted in said hopper, a pair of staging rolls mounted in vertically associated relation respectively with said feed rolls, means for driving said staging and feed rolls, means providing greater surface speed of said feed rolls than that of said staging rolls, the axes of said staging rolls being disposed on the same vertical center lines as the axes of said underlying feed rolls, and said staging rolls being so spaced above said feed rolls as to wipe past the feed rolls and maintain a uniform amount of dough on said feed rolls.

2. A dough forming and extruding machine as set forth in claim 1 wherein said staging rolls are spaced apart laterally a greater distance than said feed rolls.

3. A dough forming and extruding machine as set forth in claim 1 wherein said driving means includes sprocket means mounted on the respective staging and feed rolls and chain means connecting said sprocket means, and motor means actuating said chain means.

* * * * *